(12) United States Patent
Arun et al.

(10) Patent No.: US 8,532,674 B2
(45) Date of Patent: Sep. 10, 2013

(54) METHOD OF INTELLIGENT VEHICLE DIALING

(75) Inventors: Uma Arun, Novi, MI (US); Rathinavelu Chengalvarayan, Naperville, IL (US); Kevin R. Krause, Plymouth, MI (US); Eray Yasan, Canton, MI (US); Gaurav Talwar, Farmington Hills, MI (US); Xufang Zhao, Windsor (CA); Michael A. Wuergler, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 88 days.

(21) Appl. No.: 12/965,486

(22) Filed: Dec. 10, 2010

(65) Prior Publication Data

US 2012/0149356 A1 Jun. 14, 2012

(51) Int. Cl.
*H04W 24/00* (2009.01)

(52) U.S. Cl.
USPC ............... 455/456.2; 455/569.2; 704/275; 704/270; 704/3; 704/7; 704/246; 370/310

(58) Field of Classification Search
USPC .......... 704/275, 270, 3, 7, 246; 455/456.2; 370/310
See application file for complete search history.

(56) References Cited

U.S. PATENT DOCUMENTS

| | | | | |
|---|---|---|---|---|
| 5,524,169 | A * | 6/1996 | Cohen et al. | 704/231 |
| 5,905,773 | A * | 5/1999 | Wong | 379/88.03 |
| 6,385,586 | B1 * | 5/2002 | Dietz | 704/277 |
| 6,438,468 | B1 * | 8/2002 | Muxlow et al. | 701/3 |
| 6,587,824 | B1 * | 7/2003 | Everhart et al. | 704/275 |
| 6,732,077 | B1 * | 5/2004 | Gilbert et al. | 704/270 |
| 7,523,159 | B1 * | 4/2009 | Williams et al. | 709/203 |
| 7,664,639 | B2 * | 2/2010 | Mochary et al. | 704/238 |
| 8,010,338 | B2 * | 8/2011 | Thorn | 704/8 |
| 2003/0028689 | A1 * | 2/2003 | Fasolt | 710/1 |
| 2003/0182054 | A1 * | 9/2003 | Peterson et al. | 701/207 |
| 2004/0107097 | A1 * | 6/2004 | Lenane et al. | 704/231 |
| 2005/0154596 | A1 * | 7/2005 | Mochary et al. | 704/277 |
| 2006/0046741 | A1 * | 3/2006 | Loesch | 455/456.1 |
| 2006/0074660 | A1 * | 4/2006 | Waters et al. | 704/251 |
| 2006/0211446 | A1 * | 9/2006 | Wittmann et al. | 455/552.1 |
| 2007/0005368 | A1 * | 1/2007 | Chutorash et al. | 704/275 |
| 2007/0073539 | A1 * | 3/2007 | Chengalvarayan et al. | 704/245 |
| 2007/0109984 | A1 * | 5/2007 | Buchholz et al. | 370/310.2 |
| 2007/0136069 | A1 * | 6/2007 | Veliu et al. | 704/270 |
| 2008/0140278 | A1 * | 6/2008 | Breed | 701/29 |
| 2008/0255843 | A1 * | 10/2008 | Sun et al. | 704/250 |
| 2009/0177462 | A1 * | 7/2009 | Alfven | 704/3 |
| 2010/0082559 | A1 * | 4/2010 | Sumcad et al. | 707/695 |
| 2010/0161311 | A1 * | 6/2010 | Massuh | 704/7 |
| 2010/0185434 | A1 * | 7/2010 | Burvall et al. | 704/3 |
| 2011/0112765 | A1 * | 5/2011 | Lai | 701/213 |
| 2011/0257974 | A1 * | 10/2011 | Kristjansson et al. | 704/246 |

* cited by examiner

*Primary Examiner* — Charles Shedrick

(74) *Attorney, Agent, or Firm* — Anthony Luke Simon; Reising Ethington P.C.

(57) ABSTRACT

A method of operating a vehicle telematics unit includes determining the location of a vehicle equipped with a vehicle telematics unit; determining if telematics dialing software operated by the vehicle telematics unit includes a verbal dialing protocol used at the determined vehicle location; if not, identifying one or more verbal dialing protocols used at the determined location of the vehicle; requesting telematics dialing software that includes the one or more identified verbal dialing protocols; receiving the requested telematics dialing software from a central facility; and storing the received telematics dialing software at the vehicle.

20 Claims, 2 Drawing Sheets

US 8,532,674 B2

METHOD OF INTELLIGENT VEHICLE DIALING

TECHNICAL FIELD

The present invention relates generally to vehicles and more specifically to vehicle communications systems.

BACKGROUND OF THE INVENTION

Vehicle manufacturers outfit their vehicles with an increasing number of wireless communications capabilities. Telematics units installed in modern vehicles can wirelessly communicate both voice and data communications between the vehicle and a variety of recipients. Voice and data communications can be carried out while the vehicle moves from one point to another. The telematics units can also provide a number of services to telematics service subscribers, such as vehicle owners or operators. These services include turn-by-turn directions, assistance in case of emergency, and telephone dialing. However, vehicles are inherently mobile and designed to travel distances both large and small. While the vehicle could be delivered to a customer in one geographic area, it is possible that through the sale of the vehicle or its regular operation, the vehicle could ultimately operate in a geographical area that is much different or further away than the one where it was delivered. As a result, the telematics unit may not be optimally prepared to provide telematics services.

SUMMARY OF THE INVENTION

According to an embodiment of the invention, there is provided a method of operating a vehicle telematics unit. The method includes the steps of determining the location of a vehicle equipped with a vehicle telematics unit; determining if telematics dialing software operated by the vehicle telematics unit includes a verbal dialing protocol used at the determined vehicle location; if not, identifying one or more verbal dialing protocols used at the determined location of the vehicle; requesting telematics dialing software that includes the one or more identified verbal dialing protocols; receiving the requested telematics dialing software from a central facility; and storing the received telematics dialing software at the vehicle.

According to another embodiment of the invention, there is provided a method of operating a vehicle telematics unit that includes the steps of providing telematics dialing software that includes a verbal dialing protocol associated with one or more mobile country codes to a vehicle equipped with a telematics unit; obtaining a local mobile country code from a wireless carrier system in communication with the telematics unit; determining if the obtained local mobile country code matches the one or more mobile country codes; if not, requesting telematics dialing software that includes the verbal dialing protocol associated with the local mobile country code from a central facility; and storing the requested telematics dialing software at the vehicle.

According to yet another embodiment of the invention, there is provided a method of operating a vehicle telematics unit that includes the steps of establishing a geographical boundary of a geographic area in which one or more verbal dialing protocols are used; detecting that a vehicle equipped with a vehicle telematics unit has crossed the geographical boundary; determining the verbal dialing protocol on the side of the established geographical boundary the vehicle crossed into; requesting telematics dialing software that includes the determined verbal dialing protocol from a central facility; and storing the requested telematics dialing software at the vehicle.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENTS

Telematics-equipped vehicles can place telephone calls using one or more verbal dialing protocols the choice of which can depend on the telephone numbering plan used at the vehicle location. The telephone numbering plan or dial plan can be described as the format of the dialed numbers, such as the total number of dialed numbers and subgroups of digits within the dialed numbers. For example, the United States primarily uses a dial plan having ten digits. And the ten digits can include two or more subgroups, such as a three digit area code and a seven digit main number. The seven digit main number can be further split into two subgroups including a subgroup of three digits and another subgroup of four digits. In addition to the example above, a number of other dial plans and subgroups are possible depending on the vehicle location, such as a particular country. Other countries may use dial plans and/or subgroups that are different that those used in the United States. For instance, Mexico may use a seven or eight digit dial plan depending on the location within Mexico. The eight digit dial plan can use two subgroups each including four digits or four subgroups each including two digits. Depending on the area and/or country, a large number of different dial plans and/or subgroups are possible.

When a user places a call, the user can recite the telephone number using a verbal dialing protocol or pattern. The verbal dialing protocol in one geographical area or country may be different from that used in another area or country depending on the dial plan. Using the United States as an example, the user may recite the first subgroup of numbers (e.g. the area code), pause, recite a second subgroup of numbers (e.g. three digits), pause, and then recite a third subgroup of number (e.g. four digits). The verbal dialing protocol or cadence used when verbally reciting the telephone number may be easily recognizable when a speech recognition system expects that protocol or cadence. However, if the user places a call by reciting a number using a different verbal dialing protocol, the speech recognition system may not immediately recognize the telephone number or may not be able to interpret the telephone number as it is received from the user. Given that vehicles are by nature mobile and frequently move from one location to another, the dial plan and the verbal dialing protocol used to make calls in the past may no longer effectively function as it had. Therefore, it can be helpful to determine if the verbal dialing protocols used by the vehicle user or vehicle have changed. And if the vehicle does not have telematics dialing software that uses the changed verbal dialing protocols, then software that includes those dialing protocols can be requested and received.

Figure 1:
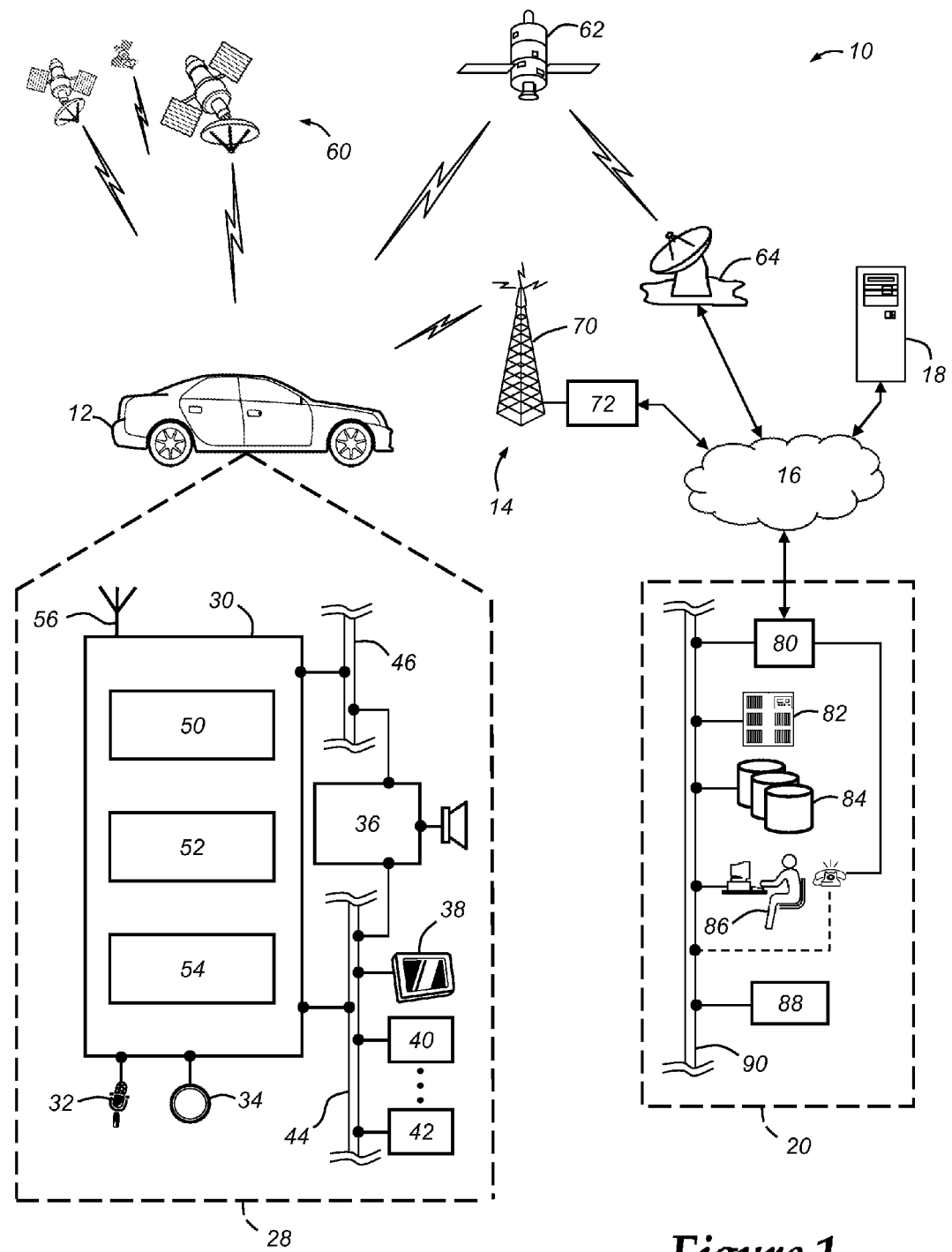
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a cellular call (a voice channel and/or a data channel) with wireless carrier system 14 so that voice and/or data transmissions can be sent and received over the call. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a vocoder, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. VSM 42 can also be a crash detection module and/or comprise one or more vehicle sensors that are capable of detecting a vehicle accident. In one example, a vehicle sensor capable of detecting a vehicle accident can be an accelerometer or other device capable of sensing change in vehicle motion and/or direction. However, other sensors are possible. Vehicle sensors that are capable of detecting a vehicle accident can be included in the vehicle electronics 28 to provide vehicle accident detection information to the telematics unit 30. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30 (e.g. a data center); a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. The call center 20 is given as one example of a central facility and it should be appreciated that other implementations are possible. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
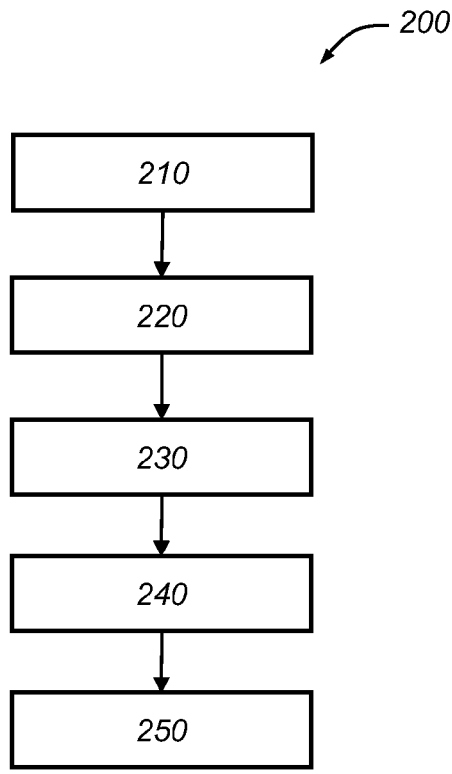
FIG. 2 is a flow chart of one method of operating a vehicle telematics unit.

Turning now to FIG. 2, there is a method 200 of operating a vehicle telematics unit. The method 200 begins at step 210 with providing telematics dialing software that includes a verbal dialing protocol associated with one or more mobile country codes to a vehicle equipped with a vehicle telematics unit. This software can include one or more features for receiving telephone numbers from the user and processing those numbers in a way that directs the vehicle telematics unit to wirelessly call that number. The telematics dialing software can include the capability to receive the telephone number(s) spoken by the user and dial telephone numbers at the vehicle 12 using the vehicle telematics unit 30. With respect to its storage at the vehicle 12, telematics dialing software can include a programmable or re-programmable verbal dialing protocol that can correspond to one or more particular dial plans. These verbal dialing protocols can be used by an automated speech recognition (ASR) system on the vehicle to process the speech so as to recognize the spoken dialing digits and thereafter automatically place a call to the spoken phone number.

The verbal dialing protocol can be identified and/or function based on one or more telephonic country codes, such as a Mobile Country Code (MCC). An MCC can be described as one portion of an International Mobile Subscriber Identity (IMSI) number and can be stored on a wireless device and used to identify the home location of the caller. However, the MCC of a geographical location, such as a country, can also be broadcast by one or more components of the wireless carrier system 14 that are within communication range of the vehicle 12, such as the cell tower 70. The vehicle telematics unit 30 can wirelessly receive and interpret the MCC that is broadcast by the wireless carrier system 14 thereby determining the country or geographic area in which the vehicle 12 is located. This received MCC can also be referred to or described as a local mobile country code or local MCC. Depending on the location, the vehicle telematics unit 30 may receive and interpret other information along with the MCC. This may be beneficial in areas or countries that use more than one MCC, such as the United States. In one example, the vehicle telematics unit 30 can receive from the wireless carrier system 14 the MCC and a Mobile Network Code (MNC) that can further identify not only the country/area in which the vehicle 12 is located but also the identity of the cellular network operating the wireless carrier system 14.

One or more versions of telematics dialing software can be stored at a facility, such as the call center 20 or a facility that manufactures vehicles 12. The telematics dialing software can be transferred to and stored at the vehicle telematics unit 30 in various ways, such as at the point of manufacture via wired connection or at a vehicle dealership via wireless transmission from the call center 20. Also, a particular version of telematics dialing software can be identified and stored at the vehicle 12 based on any one or more criteria. An example of these criteria can include the location of the point of sale where the vehicle 12 will be delivered by the manufacturer. The manufacturing facility can determine the destination of the point of sale (e.g. the location of the vehicle dealer to receive the vehicle 12), identify one or more MCCs used at the point of sale, identify the telematics dialing software that includes a verbal dialing protocol used with telephone numbers and/or dial plan at the point of sale based on the identified MCCs, and store the telematics dialing software at the vehicle 12. In another example, the vehicle 12 can be delivered to the point of sale, such as a vehicle dealership, and as part of delivering the vehicle 12 to a customer that dealership can direct the vehicle telematics unit 30 to obtain the appropriate telematics dialing software from the call center 20. The method 200 proceeds to step 220.

At step 220, the location of the vehicle 12 equipped with the vehicle telematics unit 30 is determined. This can include obtaining the MCC from the wireless carrier system 14 in communication with the vehicle telematics unit 30. This obtained MCC can also be called the local MCC. Once the MCC is obtained, then the MCC can be cross-referenced with a particular country that is associated with the obtained MCC. And after the particular country associated with the obtained MCC is identified, it can be inferred or (determined) that the vehicle 12 is located in that country. In one example, the vehicle telematics unit 30 receives a signal broadcast from the cell tower 70 used by the wireless carrier system 14. The received signal can include the MCC indicating the country (or geographical area) in which that cell tower 70 is operating. The vehicle telematics unit 30 can access a look-up table stored at the vehicle 12 that cross-references a plurality of MCCs and the countries they identify. By accessing the look-up table, the vehicle telematics unit 30 can determine the country in which it is located. In another implementation, the call center 20 can maintain the look-up table that cross-references MCCs and countries. That way, the vehicle telematics unit 30 can send the obtained MCC from the vehicle 12 to the call center 20 where the call center 20 can determine the identity of the country in which the vehicle 12 is operating. Once the call center 20 identifies the country, telematics dialing software can be identified based on the country identity. This will be discussed below in more detail. The method 200 proceeds to step 230.

At step 230, it is determined if the telematics dialing software operated by the vehicle telematics unit includes a verbal dialing protocol used at the determined vehicle location. The vehicle telematics unit 30 uses software for carrying out its functions. This software can include telematics dialing software that can be operated by the user to place calls using the vehicle telematics unit 30. The telematics dialing software can be programmed to include one or more verbal dialing protocols that may be used in the country or geographical area indicated by the obtained MCC. This can mean that the telematics dialing software includes functionality that can compensate for the pauses the user (e.g. vehicle occupant) may include as part of the verbal dialing protocol used in that country or geographical area. Verbal dialing protocols can be associated with countries in a variety of ways. For instance, the call center 20 can maintain a database linking countries, MCCs, and/or the verbal dialing protocols used with respect to a country or a location. This database can be constructed and maintained at a back office site yet also be accessible to the call center 20. This database can also include software identifiers that represent the version of telematics dialing software used with respect to a country, MCC, and/or verbal dialing protocol. More particularly, the telematics dialing software can include a software identifier that provides information about the software, such as version number, date of issue, along with information that indicates the verbal dialing protocols the software uses. For example, the obtained MCC can be compared with the software identifier associated with the telematics dialing software stored at the vehicle 12. The software identifier can include the verbal dialing protocols and/or MCCs that the telematics dialing software includes or is compatible with. If the obtained MCC is included in the software identifier at the vehicle 12, it can be determined that the telematics dialing software operated by the vehicle telematics unit 30 includes the verbal dialing protocol used at the vehicle's location. However, if the obtained MCC is not identified in some way by the telematics dialing software or identifier, then this indicates that the verbal dialing protocol is not included with the telematics dialing software. It should be appreciated that the telematics dialing software can be incorporated with other telematics software used by the vehicle telematics unit 30 or it can be a separate software module that is accessed and operated by the vehicle telematics unit 30 along with other software modules stored at the vehicle 12. The method 200 proceeds to step 240.

At step 240, telematics dialing software is requested that includes the one or more identified verbal dialing protocols used at the location of the vehicle if the software operated by the vehicle telematics unit does not include those verbal dialing protocols. If the telematics dialing software stored at the vehicle 12 does not include one or more verbal dialing protocols used in the country or area in which the vehicle 12 has been determined to be located, a central facility can receive a request for new telematics dialing software, identify a version of software that includes the appropriate verbal dialing protocols used at the location of the vehicle 12, and the central facility can then send that version of software to the vehicle 12. The MCC obtained by the vehicle telematics unit 30 can be sent to the call center 20 where the MCC can be cross-referenced with other verbal dialing protocols and/or telematics dialing software, such as telematics dialing software identifiers. If the call center 20 locates a match between the MCC and a version of telematics dialing software that includes an appropriate verbal dialing protocol, the call center 20 can wirelessly transmit a copy of that software to the vehicle 12.

While the call center 20 may use a MCC to identify verbal dialing protocols within a particular country, it is also possible to use the MCC to identify verbal dialing protocols in countries or areas in close proximity to the country identified by the received MCC or to identify countries most often called from the country identified by the received MCC. For instance, the received MCC can be the value 208 which can indicate that the vehicle 12 is receiving the MCC from a wireless carrier system 14 in France and that the vehicle 12 is located there. Furthermore, the call center 20 can not only identify telematics dialing software that includes the verbal dialing protocol used in France, but the call center 20 can also identify software that includes verbal dialing protocols used in one or more neighboring countries, such as Germany (262), Belgium (206), Switzerland (228), Austria (232), or Italy (222), each of which can be located using the MCC value 208 of France. That is, while the vehicle 12 may presently be located in France, it may be quite likely that the vehicle 12 could travel to countries located adjacent to France or at least dial phone numbers using the dial plan of those nearby countries. Thus, the vehicle 12 can receive and store multiple verbal dialing protocols and use them in processing received verbal dialing digits, such as by detecting the cadence of the received verbal digit pattern and then applying speech processing using the associated verbal dialing protocol.

In another example, the requested telematics dialing software can include one or more verbal dialing protocols used in countries most likely to be called from the received MCC country. The countries most often called from the country identified by the received MCC may not be located nearby that country geographically. For instance, it may be determined that callers located in Japan most frequently call phone numbers in the United States using the United States dial plan. This can be determined by monitoring calls placed from a plurality of telematics-equipped vehicles and sending data indicating the country of origin and the country of destination of calls placed by the monitored vehicles 12. The call center 20, a back office facility, or other central facility can process the data obtained by these monitored calls and generate a ranked list of call destination countries for each country having an MCC. This ranked list can then be used to identify a predetermined number (e.g. three destination countries for every MCC) of likely countries that calls placed from the vehicle 12 may be directed to. Telematics dialing software can then be identified as including not only the verbal dialing protocol for the country identified by the MCC, but also one or more of those countries most likely to be called from the country identified by the MCC as well. The method 200 proceeds to step 250.

At step 250, the requested telematics dialing software is received from a central facility and is stored at the vehicle. After the appropriate telematics dialing software has been sent by a central facility, it can be received at the vehicle 12. The telematics dialing software can be wirelessly transmitted by the call center 20 and received at the vehicle telematics unit 30 using any one of a number of techniques, such as packet data communication protocols, known to those skilled in the art. Once received at the vehicle 12, the vehicle telematics unit 30 can store the received telematics dialing software in memory, such as memory 54. The method 200 then ends.

Figure 3:
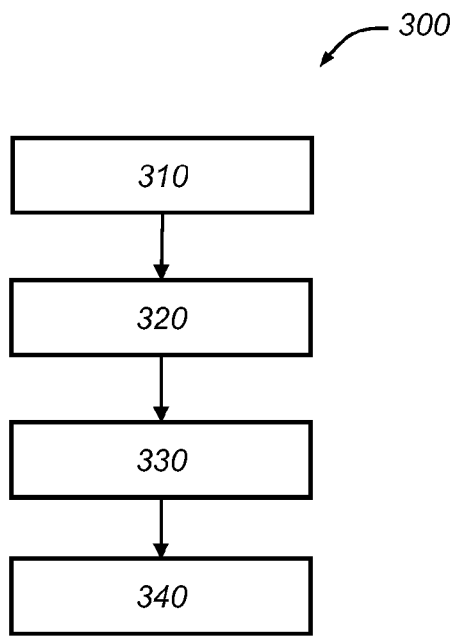
FIG. 3 is a flow chart of another method of operating a vehicle telematics unit.

Turning to FIG. 3, another method of operating a vehicle telematics unit is shown. The method 300 begins at step 310 by providing a geographic boundary of a geographic area in which one or more verbal dialing protocols are used. This boundary can be established in the vehicle in any suitable manner such as by storing it in the telematics memory. The geographic area can be described as the geographical area of a country or a group of two or more countries. It is also possible to describe the geographical area as defined by three or more GPS coordinates within which one or more verbal dialing protocols are used. For example, the geographic boundary of a geographic area could be defined as the boundary of the United States. In another example, the geographic area could be defined as the border surrounding a plurality of countries, such as France, Germany, Belgium, Switzerland, and Italy. Or in yet another example, four GPS coordinates can be identified and used to define a polygonal geographical area. The method 300 proceeds to step 320.

At step 320, it is detected that a vehicle 12 equipped with a vehicle telematics unit 30 has crossed the geographic boundary. The present location of the vehicle 12 can be compared with the geographical boundary described above and if the vehicle 12 approaches or crosses the boundary, then the vehicle 12 can identify such a condition. For example, the vehicle 12 described herein has a vehicle telematics unit 30 that includes GPS module 40, which can generate GPS coordinates identifying the location of the vehicle 12. The vehicle telematics unit 30 can compare the generated GPS coordinates with those that define the geographical boundary. The vehicle telematics unit 30 can then determine that the vehicle 12 is approaching the boundary or has crossed the geographical boundary. The method 300 proceeds to step 330.

At step 330, the verbal dialing protocol on the side of the established geographical boundary the vehicle crossed into is determined and telematics dialing software that includes the determined vehicle dialing protocol is requested. If the vehicle 12 crosses the geographical boundary, a new or different verbal dialing protocol may be used outside of the geographical area the vehicle 12 has left. In one example, the vehicle can switch to another verbal dialing protocol stored on-board that corresponds to its new location. In another example, the vehicle 12 can contact the call center 20 using the vehicle telematics unit 30 and alert the call center 20 of its new position thereby informing the call center 20 that the verbal dialing protocol may have changed. New telematics dialing software may be needed if the new geographical area that the vehicle 12 now operates in uses one or more verbal dialing protocols not supported by the telematics dialing software resident on the vehicle 12. If that is the case, the call center 20 can identify the new geographical area, determine if the new geographical area includes one or more new verbal dialing protocols, and if so, identifying software that supports the new dialing protocol(s). This software can then be wirelessly sent to the vehicle 12 from the call center 20 via the wireless carrier system 14. In another example, the vehicle 12 can determine it has crossed the geographic boundary and/or that the telematics dialing software resident on the vehicle 12 does not function optimally. The vehicle 12 can then wirelessly transmit its location to the call center 20, which can search for telematics dialing software having the verbal dialing protocol used at the transmitted location. The transmitted telematics dialing software can then be wirelessly sent to the vehicle 12 from the call center 20 via the wireless carrier system 14. The method 300 then proceeds to step 340.

At step 340, the requested telematics dialing software can be stored at the vehicle 12 in a way similar to that is shown in FIG. 2 and described with respect to step 250. The method 300 then ends.

It is to be understood that the foregoing is a description of one or more preferred exemplary embodiments of the invention. The invention is not limited to the particular embodiments disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiments will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of operating a vehicle telematics unit, comprising the steps of:
   (a) determining the location of a vehicle equipped with a vehicle telematics unit;
   (b) determining if telematics dialing software operated by the vehicle telematics unit includes a verbal dialing protocol based on a dial plan used at the determined vehicle location;
   (c) if not, identifying one or more verbal dialing protocols used at the determined location of the vehicle;
   (d) requesting telematics dialing software that includes the one or more verbal dialing protocols identified in step (c);
   (e) receiving the requested telematics dialing software from a central facility; and
   (f) storing the received telematics dialing software at the vehicle.

2. The method of claim 1, wherein the location of the vehicle is determined using a global positioning system module used by the vehicle telematics unit.

3. The method of claim 1, further comprising the step of obtaining a mobile country code from a wireless carrier system; and determining the identity of the country in which the vehicle is located based on the mobile country code.

4. The method of claim 1, further comprising the step of accessing a database located at the central facility that associates the location of the vehicle with the verbal dialing protocols used at that location.

5. The method of claim 1, further comprising the step of accessing a database located at the central facility that identifies telematics dialing software associated with one or more verbal dialing protocols.

6. The method of claim 1, further comprising the steps of:
   identifying one or more other locations nearby the location in which the vehicle is located;
   determining the verbal dialing protocol(s) in each of the identified other locations; and including the determined verbal dialing protocol(s) in the telematics dialing software received from the central facility.

7. A method of operating a vehicle telematics unit, comprising the steps of:
(a) determining the location of a vehicle equipped with a vehicle telematics unit;
(b) determining if telematics dialing software operated by the vehicle telematics unit includes a verbal dialing protocol used at the determined vehicle location;
(c) if not, identifying one or more verbal dialing protocols used at the determined location of the vehicle;
(d) requesting telematics dialing software that includes the one or more verbal dialing protocols identified in step (c);
(e) receiving the requested telematics dialing software from a central facility;
(f) storing the received telematics dialing software at the vehicle;
(g) determining the frequency with which calls are made from the location of the vehicle to one or more other locations;
(h) identifying a predetermined number of the other locations that are most-frequently dialed from the location of the vehicle; and
(i) including verbal dialing protocols for each of the predetermined number of other locations with the received telematics dialing software.

8. A method of operating a vehicle telematics unit, comprising the steps of:
(a) providing telematics dialing software that includes a verbal dialing protocol based on a dial plan associated with one or more mobile country codes to a vehicle equipped with a vehicle telematics unit;
(b) obtaining a local mobile country code from a wireless carrier system in communication with the vehicle telematics unit;
(c) determining if the obtained local mobile country code matches the one or more mobile country codes;
(d) if not, requesting telematics dialing software that includes the verbal dialing protocol associated with the local mobile country code from a central facility; and
(e) storing the requested telematics dialing software at the vehicle.

9. The method of claim 8, wherein the match between the obtained local mobile country code and one or more mobile country code is carried out using the vehicle telematics unit.

10. The method of claim 8, further comprising the step of accessing a database located at the central facility that associates the mobile country code with the verbal dialing protocols used at a country identified by the mobile country code.

11. The method of claim 8, further comprising the step of accessing a database located at the central facility that identifies telematics dialing software associated with one or more verbal dialing protocols.

12. The method of claim 8, further comprising the steps of:
identifying one or more mobile country codes for countries that neighbor the local mobile country code;
determining the verbal dialing protocol in each of the identified neighboring countries; and
including the determined verbal dialing protocol(s) in the telematics dialing software requested from the central facility and sending the telematics dialing software to the vehicle.

13. The method of claim 8, further comprising the steps of:
determining the frequency with which calls are made from the country identified by the local mobile country code to one or more other countries having a mobile country code;
identifying a predetermined number of the other countries that are most-frequently dialed from the country identified by the local mobile country code;
including verbal dialing protocols for each of the predetermined number of other countries with the requested telematics dialing software; and
sending the verbal dialing protocols for each of the predetermined number of other countries along with the telematics dialing software from the central facility to the vehicle.

14. A method of operating a vehicle telematics unit, comprising the steps of:
(a) establishing a geographical boundary of a geographic area in which one or more verbal dialing protocols are used, wherein each verbal dialing protocol is based on a dial plan;
(b) detecting that a vehicle equipped with a vehicle telematics unit has crossed the geographical boundary;
(c) determining the verbal dialing protocol on the side of the established geographical boundary the vehicle crossed into;
(d) requesting telematics dialing software that includes the determined verbal dialing protocol from a central facility; and
(e) storing the requested telematics dialing software at the vehicle.

15. The method of claim 14, further comprising the step of detecting that the vehicle has crossed the geographical boundary using a global positioning system module used by the vehicle telematics unit.

16. The method of claim 14, wherein the step of determining the verbal dialing protocol further comprising obtaining a mobile country code from a wireless carrier system; and determining the identity of the country in which the vehicle is located based on the mobile country code.

17. The method of claim 16, further comprising the step of accessing a database located at the central facility that associates the mobile country code with the verbal dialing protocols used at the country identified by the mobile country code.

18. The method of claim 14, further comprising the step of accessing a database located at the central facility that identifies telematics dialing software associated with one or more verbal dialing protocols.

19. The method of claim 14, further comprising the steps of:
identifying one or more geographical areas that neighbor the geographical area;
determining the verbal dialing protocol in each of the identified neighboring geographical areas; and
including the determined verbal dialing protocol(s) in the telematics dialing software requested from the central facility and sending the telematics dialing software to the vehicle.

20. The method of claim 14, further comprising the steps of:
determining the frequency with which calls are made from the geographical area to one or more other geographical areas;
identifying a predetermined number of other geographical areas that are most-frequently dialed from the geographical area;

including verbal dialing protocols for each of the predetermined number of other geographical areas with the requested telematics dialing software; and sending the verbal dialing protocols for each of the other geographical areas along with the telematics dialing software from the central facility to the vehicle.

\* \* \* \* \*